US012007076B2

(12) United States Patent
Horaczek

(10) Patent No.: US 12,007,076 B2
(45) Date of Patent: Jun. 11, 2024

(54) LIGHT BULB

(71) Applicant: SIGNIFY HOLDING B.V., Eindhoven (NL)

(72) Inventor: Michal Jan Horaczek, Best (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/924,225

(22) PCT Filed: May 25, 2021

(86) PCT No.: PCT/EP2021/063773

§ 371 (c)(1),
(2) Date: Nov. 9, 2022

(87) PCT Pub. No.: WO2021/239670

PCT Pub. Date: Dec. 2, 2021

(65) Prior Publication Data

US 2023/0184393 A1 Jun. 15, 2023

(30) Foreign Application Priority Data

May 28, 2020 (EP) .................................... 20177042

(51) Int. Cl.

| | |
|---|---|
| ***F21K 9/232*** | (2016.01) |
| ***F21K 9/237*** | (2016.01) |
| ***F21K 9/90*** | (2016.01) |
| ***F21V 23/00*** | (2015.01) |
| *F21Y 115/10* | (2016.01) |

(52) U.S. Cl.
CPC .............. *F21K 9/232* (2016.08); *F21K 9/237* (2016.08); *F21K 9/90* (2013.01); *F21V 23/002* (2013.01); *F21Y 2115/10* (2016.08)

(58) Field of Classification Search
CPC .......... F21K 9/237; F21K 9/232; F21K 9/235; F21K 9/238; F21K 9/90; F21V 3/02; F21V 9/30; F21V 29/70; F21V 3/061; F21V 3/062; F21V 19/003; F21Y 2103/33
See application file for complete search history.

(56) References Cited

U.S. PATENT DOCUMENTS

| | | | |
|---|---|---|---|
| 4,135,485 | A | 1/1979 | Loyd, Jr. |
| 4,290,887 | A | 9/1981 | Brown et al. |
| 6,793,374 | B2 | 9/2004 | Begemann |

(Continued)

FOREIGN PATENT DOCUMENTS

| | | | |
|---|---|---|---|
| CN | 208735584 | U | 4/2019 |
| JP | H08329907 | A | 12/1996 |

(Continued)

*Primary Examiner* — Elmito Breval

(57) ABSTRACT

A light bulb (10) comprising a feedthrough body (26) for accommodating electrical conductors (24) through a glass stem (23) of the light bulb (10) is disclosed. The light bulb (10) comprises a light engine (21) arranged within a sealed light transmissive surface structure (22), a feedthrough body (26) sealed in and extending through the glass stem (23) supporting the light engine (21), a plurality of conductive wires (24) mutually electrically isolated from each other and extending through and gastightly sealed in the feedthrough body (26), the conductive wires (24) connecting the light engine (21) to at least one power and signal source.

16 Claims, 5 Drawing Sheets

(56) References Cited

U.S. PATENT DOCUMENTS

| | | | | |
|---|---|---|---|---|
| 2017/0138542 | A1* | 5/2017 | Gielen .................. | F21V 17/104 |
| 2019/0331302 | A1* | 10/2019 | Cai ......................... | F21V 29/70 |
| 2020/0132257 | A1 | 4/2020 | Hong et al. | |

FOREIGN PATENT DOCUMENTS

| | | | |
|---|---|---|---|
| JP | 2006313717 | A | 11/2006 |
| JP | 2013026053 | A | 2/2013 |
| JP | 2019220491 | A | 12/2019 |
| WO | 2013014821 | A1 | 1/2013 |
| WO | 2018041923 | A1 | 3/2018 |
| WO | 2019055803 | A2 | 3/2019 |
| WO | 2020069724 | A1 | 4/2020 |

* cited by examiner

LIGHT BULB

CROSS-REFERENCE TO PRIOR APPLICATIONS

This application is the U.S. National Phase application under 35 U.S.C. § 371 of International Application No. PCT/EP2021/063773, filed on May 25, 2021, which claims the benefit of European Application No. 20177042.7, filed on May 28, 2020. These applications are hereby incorporated by reference herein.

TECHNICAL FIELD

The present disclosure generally relates to the field of illumination technologies and, more specifically, to a light bulb comprising a multi-wire gas tight feedthrough in a glass stem.

BACKGROUND

A traditional incandescent bulb or lamp typically comprises a transmissive surface structure, a filament, a centralized stem and connecting wires. The surface structure is normally a glass shell in the shape of a globe and arranged for distributing light produced by the filament. The filament is usually made of tungsten and arranged inside the transmissive surface structure for producing light. The stem is generally made of glass and arranged in the centre of the surface structure for supporting the filament. The connecting wires are arranged for ensuring supply of electricity through components of the traditional incandescent bulb.

With the conventional incandescent bulb there are normally two wires, referred to as lead-in wires, going through the glass stem and respectively arranged for being connected to the positive and negative ("+" and "−") contacts of a power supply located in a base of the incandescent bulb.

In contrast, newly developed tuneable LED filament lamps generally requires more than two wires running through the glass stem. One reason lies in that a light engine of a LED filament lamp, which is equivalent to the filament of the conventional bulb, comprises components such as communication elements for receiving signals for controlling LED light sources, in addition to the LEDs which may be in different colours. It therefore may require more than two, in general three to six interconnecting lines, for power and signals, between a driver and the light engine located in gas-tight bulb.

With the conventional incandescent bulb, the lead-in wires are, during the production process, melted in or pressed into the molten glass stem at temperatures of more than one thousand degrees Celsius. Such high temperature makes it impossible for the wires to be isolated from each other, as the isolation will be melted during the stem forming process.

Besides, a number of wires which can be melted in the glass stem in the traditional way is currently limited to maximally four wires. The wires melted in such a way are also restricted in size and material.

All the above factors make it difficult or infeasible to arrange the number of wires required by new lamps in the glass stem using the conventional way.

Therefore, there is a genuine need for a light bulb which can accommodate a larger number of wires in the glass stem and a method for producing such a light bulb.

SUMMARY

In a first aspect of the present disclosure, there is presented a light bulb comprising: a light engine arranged within a space enclosed by a light transmissive surface structure and a glass stem;

the glass stem comprising a mutually connected flare and tubular portion, the stem supporting the light engine and is fused by its flare to the light transmissive surface structure;

a feedthrough body extending through the glass stem and being fixed by fusion in said tubular portion, wherein the feedthrough body is provided with a plurality of electrical conductors electrically isolated from each other which extend through the glass stem and connect said light engine to at least one power and signal source.

The present disclosure is based on the insight that a feedthrough body fixed or melted within the glass stem can be used to accommodate multiple electrical conductors, for example wires or conductive tracks, mutually electrically isolated from each other, for example more than four conductors, such as five, six or even twelve. Hence, more conductors are available for connecting a filament or a light engine to a power and signal source, while avoiding the problem with the conventional lamps. The feedthrough body provided with the electrical conductors in practice forms a single unit, which unit as a whole can be fixed in the tubular portion of the stem. By the light bulb according to the invention the risk of electrical conductors mutually contacting each other or being accommodated in the stem relatively close to each other after being fixed in the stem, is counteracted. Hence, not only the reliability and safety of the light bulb is improved, yet compared to light bulbs according to the prior art, it is also enabled of passing a relatively large number of electrical current conductors through the glass stem to the light engine accommodated in the space.

The light bulb according to the invention may have the feature that the space is gastightly sealed by the light transmissive surface structure and the glass stem, wherein the feedthrough body is sealingly fixed, for example by fusion or melting, over a sealing length in a gastight manner in said tubular portion, and wherein said electrical conductors extend in a gastight manner through the glass stem. The gastight sealing of the space renders the light bulb to have the space filled with a special gas and which is being confined therein, for example a gas, such as neon, that improves heat conduction away from the light engine to the light transmissive surface structure and the exterior, and hence rendering the lamp to have a better performance and maintenance.

The technical solution of the present disclosure may have the feature that use could be made of a feedthrough tube or sleeve as feedthrough body that is melted in and run through the glass stem. Typically the electrical conductors are then embodied as connecting, electrically conducting wires. The connecting wires are then planted or potted and sealed in the feedthrough tube. This means that the multiple wires will not be subjected to high temperatures exceeding, for example, 1400 degrees Celsius. The wires can therefore be made of cheaper materials, like copper instead of tungsten. Another advantage with the solution is that the wires can be made thinner, and can be individually insulated, such that more wires can be accommodated in the feedthrough tube sealed in the glass stem.

The light bulb may have the feature that the glass stem has a first coefficient of thermal expansion and the feedthrough body has a second coefficient of thermal expansion, wherein the first and second coefficient of thermal expansion differ by no more than |2.5*10-6/K|, such as by no more than |1*10-6/K|. By limiting the difference in coefficient of thermal expansion between the stem and the feedthrough body, the risk of damage, such as fracture, of the fixing connection between the stem and the feedthrough body is counteracted rendering the light bulb more reliable. Furthermore, a more reliable gastight sealing of the space is obtained.

In an embodiment of the present disclosure, the feedthrough tube is made of a metal. A metal is well suited material for the feedthrough tube as it can withstand high temperatures needed to have the tube sealed in the glass stem while ensuring gas tightness between the tube and glass stem. In a particular embodiment of the present disclosure, the metal comprises kovar, vacovit, tungsten, molybdenum, (Cr)NiFe, $Al_2O_3$. These are all readily available materials and can be used to form the tube sealed in the glass stem.

On the other hand, in another embodiment of the present disclosure, the feedthrough body is made of a ceramic or glass. Ceramic materials can also withstand high temperatures. Examples of ceramic can include $Al_2O_3$ (with a melting point of 2072° C.) or SiAlON (with a melting point of 2745° C.). Types of glass with transition or melting temperature higher than glass used for bulb stem can include fused quartz or fused silica glass (melting point 1650° C.).

In an embodiment of the present disclosure, the plurality of conductive wires are gas tightly sealed in the feedthrough tube using an elastic and adhesive sealing compound. The sealing compound helps to ensure the gas tightness between the feedthrough tube and each of the conductive wires. Therefore the sealing compound needs to show sufficient elasticity and adhesion to the feedthrough tube and wire insulation in order to compensate between coefficients of thermal expansion mismatch between the materials of the feedthrough tube and the wires. A sealing compound which is elastic and adhesive is suitable for such purpose.

In an exemplary embodiment of the present disclosure, the sealing compound comprises one of glue and epoxy. Specifically, the sealing compound may comprise epoxy resin, amorphous silica, oxybis(ethyleneoxy)bis(propylamine), titanium dioxide, butyl 2,3-epoxypropyl ether, nonfibrous aluminum oxide, and bisphenol-A epichlorhydrin. These compounds have the appropriate properties for gastightly sealing the conductive wires in the feedthrough tube.

In an exemplary embodiment of the present disclosure, the plurality of conductive wires are individually insulated with an insulation layer having a coefficient of thermal expansion matching that of the conductive wires. As the conductive wires are planted in the feedthrough tube, which is already sealed in glass stem, the wires do not need to withstand the high temperature required for melting the wires in the glass stem, therefore, a very thin insulation material may be applied to each wire. This thin insulation layer will ensure that the conductive wires are securely insulated from each other, allowing a larger number of conductive wires to be planted in the feedthrough tube, thereby accommodating the need of new lamps requiring more connecting wires.

In an embodiment of the present disclosure, the insulation layer is made of one of mylar and silicone. As each wire is individually insulated with a very thin insulation layer, which is similar to a design used in Litz wires, there is no need to maintain isolation between the wires in the feedthrough tube before and after sealing. This helps to make the planting or potting of the wires much easier.

In an embodiment of the present disclosure, the plurality of conductive wires has a diameter in a range of 0.2 mm-0.5 mm. Since the conductive wires are not exposed to temperatures corresponding to glass melting of 1400 degrees Celsius, a diameter in the range of 0.2-0.5 mm is sufficient to provide the required electric and mechanic properties of the wires.

In an embodiment of the present disclosure, a number of the conductive wires is three or more, such as six, or nine. This is advantageous especially for new type of light bulbs or lamps which require at least four connecting wires for connecting the filament or light engine to the power and signal source, thereby allowing the light bulbs or lamps to be controlled in different ways, providing more lighting operation modes as desired by customers.

In an embodiment of the present disclosure, the feedthrough tube has an inner diameter in a range of 1.0 mm-3.5 mm. The feedthrough tube has an inner diameter large enough to accommodate the required number of wires. The inner diameter may be chosen based on the diameter of the conductive wires and the number of wires to be planted in the feedthrough tube. The feedthrough tube typically has a wall thickness in the range of 0.5-1.5 mm to render it to have appropriate thermal isolation properties to adequately protect the electrically conductive wires passing through it against heat generated during the fixing/sealing process.

The light bulb may have the feature that the feedthrough body is made of an electrically insulating material and electrical conductors are conductive tracks provided on a surface of the feedthrough body. The provision of such conductive tracks can easily and conventionally be obtained via screen printing, pasting providing a thick film, such as 0.1-1 mm thickness, or via Physical Vapour Deposition (PVD), Chemical Vapour Deposition (CVD), Chemical Solution Deposition (CSD), or via lithography typically providing a thin film, such as 0.001-0.1 mm thickness. Suitable materials to be used as conductive tracks are, for example, copper, molybdenum, tungsten or cermets. Suitable cermets are, for example, a refractory oxide comprising alumina and metal comprising tungsten or molybdenum typically in an amount of 0.1-0.2 volume fraction; or aluminum nitride and from about 40% to about 50% by weight of aluminum metal. Thereto, the light bulb may have the feature that the tracks are made of copper or cermet material comprising alumina and/or aluminum nitride as a refractory oxide and aluminum, molybdenum and/or tungsten as a metal. These materials are suitable for this purpose. Upon fusing and/or sealing the tubular portion of the glass stem with the bar/rod shaped feedthrough body, having deposited conductive tracks thereon, a secured or gastight passing of the electrical conductors through the glass stem is obtained.

The light bulb may have the feature that said feedthrough body is made of a ceramic, or a glass and wherein the electrical conductors are conductive tracks provided on an outer surface of the feedthrough body, for example a solid rod or a solid bar. This bar-shaped or rod-shaped feedthrough body is fixed or sealed into the tubular portion of the stem to attain the electrical conductors to pass through the glass stem in the desired manner. Optionally, as an alternative or additional way via which the electrical conductors pass through the stem, the solid bar or rod provided with the electrically conductive track is a first feedthrough body, which functions as a substitute for the plurality of loose electric wires, and which is fixed or sealed into a second feedthrough body, i.e. the feedthrough tube. The combined feedthrough construction of the first and second feedthrough body subsequently can be sealed as a single unit into the tubular portion of the glass stem to obtain the desired passing of the electrical conductors through the glass stem.

The light bulb may have the feature that said feedthrough body is made of a ceramic or a glass, and wherein the glass stem has a first melting point Tm1 and the feedthrough body has a second melting point Tm2, wherein Tm2−Tm1>=75° C. Such a minimum or larger temperature difference facilitates the sealing of the feedthrough carrier in the tubular portion of the glass stem as it lowers the risk of too large deformation of the feedthrough body and thus reduces the risk of mutual contact between electrical conductors and/or damage, such as fracture, thereof. In a second aspect of the present disclosure, there is presented a method of manufacturing the light bulb in accordance with the first aspect of the present disclosure. The method comprises the steps of:

I) fixing, for example by melting or gluing, a feedthrough body, in a tubular portion of a glass stem;

II) providing a feedthrough body with a plurality of mutually electrically isolated electrical conductors;

III) connecting said plurality of electrical conductors with light engine contacts supported by said glass stem;

IV) arranging said light engine in a space enclosed by a light transmissive surface; and V) closing said space by assembling said glass stem and said light transmissive surface structure by fusion melting said light transmissive surface with a flare portion of the glass stem.

Considering that the sealing compound for sealing the conductive wires in the feedthrough body may not withstand the comparatively high temperatures for fixing, for example sealing via melting, the feedthrough body in the glass stem, the method of the present disclosure first seals the feedthrough body in the glass stem. Then, the conductive wires are planted and sealed in the feedthrough tube at a suitable temperature. The given sequence of step I and II eliminates the concern of having the conductive wires damaged if subjected to high temperatures. Alternatively, steps I and II may be carried out in reverse order, for example when a feedthrough carrier is used with deposited electrically conductive tracks thereon.

In an embodiment of the method of the present disclosure, the space is gastightly sealed by the light transmissive surface structure and the glass stem, the feedthrough body is sealingly fixed over a sealing length in a gastight manner in said tubular portion, and said electrical conductors extend in a gastight manner through the glass stem, the method further comprises a step of filling a gas to the light transmissive surface structure via a gas feeding tube and sealing the space by gastightly sealing the tubular portion.

In an embodiment of the present disclosure, the method further comprises a step of blinding said gas feeding tube, rendering the feedthrough body to be less obtrusive and to counteract scattering of light.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

Figure 1:
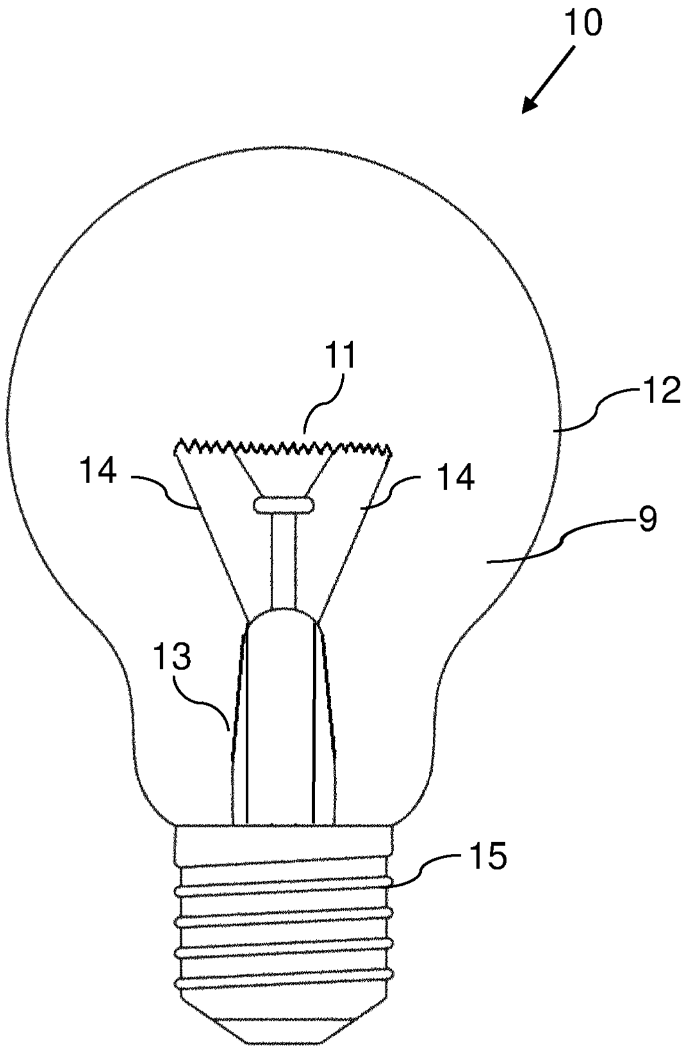
FIG. 1 schematically illustrates an incandescent bulb according to the prior art.

FIG. 1 schematically illustrates an incandescent light bulb 10 according to the prior art. The light bulb 10 comprises a filament 11 arranged within a space 9 gastightly sealed by a light transmissive surface structure 12 and a glass stem 13. The filament 11 is usually made of tungsten or outer suitable metal materials, and functions to conduct electricity and to emit light. The gas sealed light transmissive surface structure 12 typically has a shape of a globe and functions to protect inner components of the light bulb 10. The globe 12 is generally made of a hard glass such as soda-lime glass, so as to withstand higher temperatures.

The light bulb 10 further comprises the stem 13, which is made of glass and functions to protect wires 14 arranged therein and to support and lift the filament 11 into a spatial orientation within the globe 12 so as to dissipate the light with a spatial light distribution.

The wires 14, often referred to as lead-in wires, connect the filament 11 to a power source (not shown) arranged in a base 15 of the light bulb 10, to carry current from the base 15 to the filament 11. The wires 14 are usually made of nickel plated copper.

While there are often two wires 14 for the conventional incandescent light bulb 10, newly developed tunable light bulbs may require more wires, for example, three to six or ten interconnecting lines for connecting to a power source and signal lines.

A light bulb in accordance with the present disclosure will be described in the following with reference to FIGS. 2, 3A-C and 4A-B.

Figure 2:
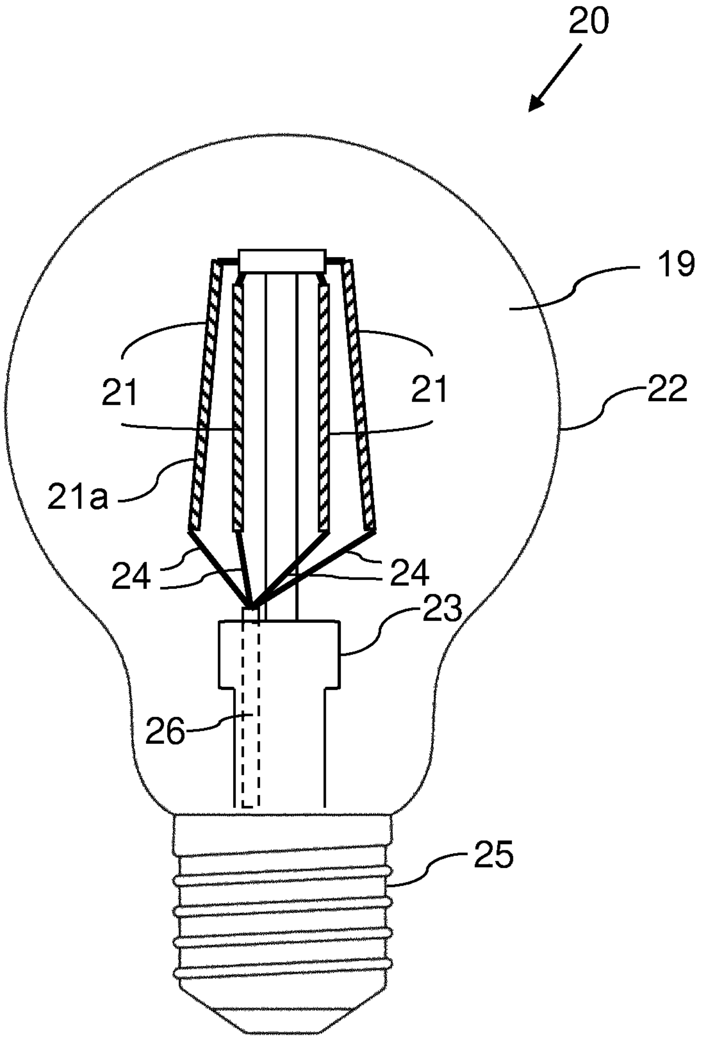
FIG. 2 schematically illustrates a light bulb in accordance with the present disclosure.
Figure 3A:
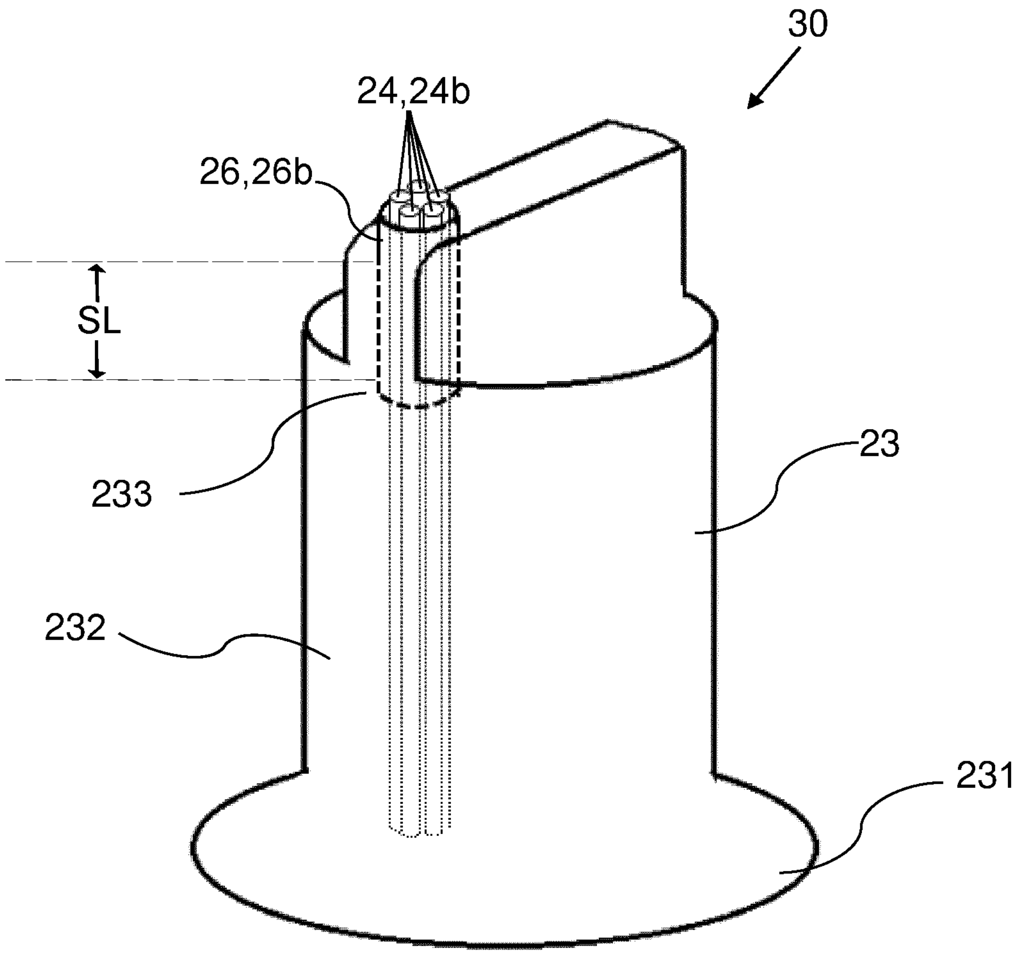
FIG. 3A-C schematically illustrates an enlarged view of a feedthrough body disposed in a glass stem and cross-sections of some examples of feedthrough bodies with electrical conductors sealed therein, in accordance with the present disclosure.
Figure 3B:
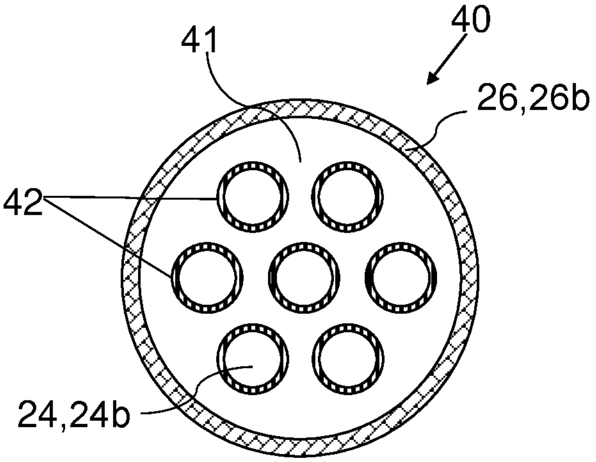
Figure 3C:
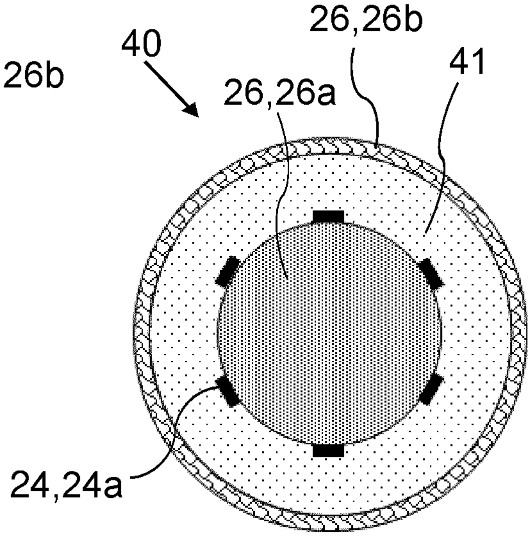

FIG. 2 schematically illustrates a light bulb 20 in accordance with the present disclosure. FIG. 3A schematically illustrates an enlarged view 30 of a feedthrough body, in the FIG. 3A-B a feedthrough tube, disposed in a glass stem, with conductive wires sealed therein. FIG. 3B schematically illustrates a section view 40 of another embodiment of a feedthrough tube with conductive connecting wires sealed therein. FIG. 3C schematically illustrates a section view 40 of yet another feedthrough construction.

With reference to FIGS. 2 and 3A, the light bulb 20 may comprises one or more filaments, such as Light Emitting Diode, LED, filaments 21 as a light engine 21*a*, arranged within a space 19 gastightly sealed by a light transmissive surface structure 22 and a stem 23. The filament or filaments 21 is supported by a glass stem 23, the glass stem comprising a flare 231 and a tubular portion 232. A plurality of conductive wires 24, 24*b* are arranged for connecting the filaments 21 to at least one signal and power control (not shown) disposed at or in a base 25 of the light bulb 20.

A feedthrough body 26, tube or sleeve 26*b*, which may be made of a glass, a metal or a ceramic, is disposed and fixed in the glass stem 23, and arranged for accommodating the plurality of electrical conductors 24, in the figure wires 24*b*. FIG. 2 illustrates an example of the feedthrough body, tube or sleeve 26*b* arranged for accommodating five conductive wires 24*b*, one common neutral wire and four lead wires for each conductive lead wire 24*b* electrically connected to a respective LED filament 21. However, it can be contemplated by those skilled in the art that there can be more or less wires 24*b* disposed in the feedthrough tube 26*b*, as illustrated for example in FIG. 3B with seven wires 24*b*.

The feedthrough carrier 26, in the figure a metal tube 26*b*, may be melted over a sealing length SL in a sealing area 233 of a tubular 232 portion of the glass stem 23, for example together during manufacturing of the glass stem 23. Optionally, the pre-manufactured glass stem 23 can be provided with a feedthrough passage in which the feedthrough tube 26*b* is to be fit and sealed so as to provide gas tightness and/or ingress protection conforming to the Ingress Protection Code, standard.

The gas tightness between the feedthrough tube 26*b* and the glass stem 23 may be maintained by selecting appropriate material combinations for the glass and the tube. As an example, commonly known combinations of those materials defined for incandescent bulbs may be used.

As an example, the feedthrough tube 26*b* may be made of one of a group of metals comprising kovar, vacovit, tungsten, molybdenum, (Cr)NiFe, $Al_2O_3$. In the meantime, the stem 23 may be made of a glass such as soda-lime glass. Examples of suitable glasses for the stem are given in table 1.

TABLE 1

Examples of soda lime glasses.

| | | |
|---|---|---|
| Philips glass ref. nr. | 342 | 220 |
| Working point ° C. | 1030 | 970 |
| Melting point ° C. | 1475 | 1390 |
| Coeff of thermal exp. $K^{-1}$ | 10.50 | 10.30 |
| SiO2 | 66.4 | 63.6 |
| B2O3 | — | 0.8 |
| Al2O3 | 2.4 | 4.8 |
| P2O5 | — | 0.2 |
| Na2O | 6.3 | 17.0 |
| K2O | 12.7 | 0.8 |
| MgO | 0.2 | 3.0 |
| CaO | 6.0 | 4.6 |
| SrO | — | <0.15 |
| BaO | 5.6 | 4.9 |
| SO3 | — | <0.2 |

The plurality of conductive wires 24, which may comprise lead-in power wires and signal lines, are planted or potted in the feedthrough tube 26*b*. For the purpose of guaranteeing gas tightness between the feedthrough tube 26*b* and the wires 24*b*, a sealing compound 41, for example as illustrated in FIG. 3B, may be filled in the feedthrough tube 26*b* and around the wires 24*b*.

A suitable sealing compound 41 shows sufficient elasticity and adhesion to the feedthrough tube 26*b* and an insulation layer 42 around the wires 24*b*, as described in the following with reference to FIG. 3B, so as to compensate coefficient of thermal expansion mismatch between materials of the feedthrough tube 26*b* and the insulation layer 42 of the wires 24*b*. As an example, one of the group comprising epoxy resin, amorphous silica, oxybis(ethyleneoxy)bis(propylamine), titanium dioxide, butyl 2,3-epoxypropyl ether, non-fibrous aluminum oxide, bisphenol-A epichlorhydrin resin may be used as the sealing compound 41.

To ensure the electric isolation between the conductive wires 24*b*, each wire 24*b* is individually insulated with a very thin insulation layer 42, in a way similar to Litz wires. The insulation layer 42 may be made of for example mylar or silicone. As a result there is no need to maintain isolation between the wires 24*b* in the feedthrough tube 26*b* before and after sealing of the wires 24*b*.

The insulation layer 42 has a thermal expansion coefficient matching the thermal expansion coefficient of the wire 24*b*. For example, mylar has a thermal expansion coefficient, which matches the thermal expansion coefficient $1.7\times10^{-5}$ [in/in/° C.] (ASTM-D696) of copper.

An advantage of using copper wires is that they can be soldered to the power supply in the base 25 of the light bulb and the filaments directly, which is advantageous in comparison to the conventional bulb where the wires 14 in the glass stem 13 can only be welded.

Melting temperature of Mylar is ~250° C., which will provide sufficient resistance for an assembly process as described later.

Individually insulated wires helps to guarantee the gas tightness. As a result, thermal expansion coefficient mismatch of the insulation layer and the wire material is limited. The length of the wire insulation layer and the wire interface is also advantage when it comes to sealing.

The idea is that the feedthrough tube 26*b* is first sealed in the glass stem 23, before the wires 24*b* are potted in the feedthrough tube 26*b*. After that the conductive wires 24*b* are potted or planted in the sealed feedthrough tube 26*b*. In this way, the wires 24*b* are not exposed to temperatures corresponding to glass melting of around 1400° C. As a result, a diameter of the wires 24*b* may be decreased with respect to traditional through glass feedthrough.

The wires 24*b* may have a diameter in a range of 0.2 mm to 0.5 mm. A number of wires 24*b* to accommodate in the tube 26*b* may depend on an inner tube diameter. For a five channel color filament bulb, there requires feedthrough of at least five wires 24*b*, which may be achieved with an inner tube diameter of 1.0 mm to 3.5 mm.

The above described gas tightness between each pair of the glass stem and the feedthrough tube, the feedthrough tube and the sealing compound, the sealing compound and the wire insulation layer around the conductive wires, and the wire insulation layer and the wire itself helps to ensure the gastight potting or planting of the plurality of conductive wires 24*b* in the feedthrough tube 26*b* while ensuring the mutual electrical isolation between the wires 24*b*.

FIG. 3C schematically illustrates a sectional view 40 of an alternative feedthrough construction via which the electrical conductors 24 may extend through the stem. Said alternative feedthrough construction comprises a first feedthrough body 26*a*, i.e. a solid bar or rod 26*a*, provided with the electrically conductive tracks 24*a* as electrical conductors 24, which functions as a substitute for the plurality of loose electric wires, and which is fixed or sealed into a second feedthrough body, i.e. the feedthrough tube 26*b*. The first feedthrough body 26*a* is fixed with potting material 41 in the second feedthrough body 26*b*. This feedthrough construction of combined first 26*a* and second feedthrough body 26*b* can subsequently be sealed as a single unit into the tubular portion of the glass stem to obtain the desired passing of the electrical conductors 24 through the glass stem.

Figure 4A:
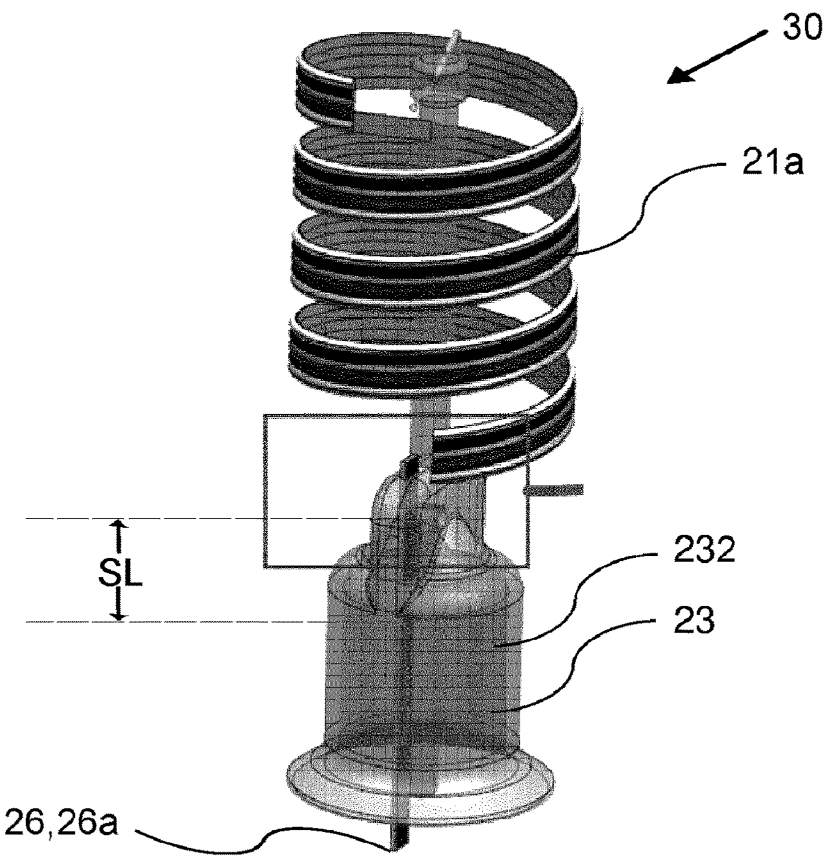
FIG. 4A-B schematically illustrates in accordance with the present disclosure an enlarged and detailed view of a feedthrough body with conductive tracks on an outer surface thereof, in accordance with the present disclosure.
Figure 4B:
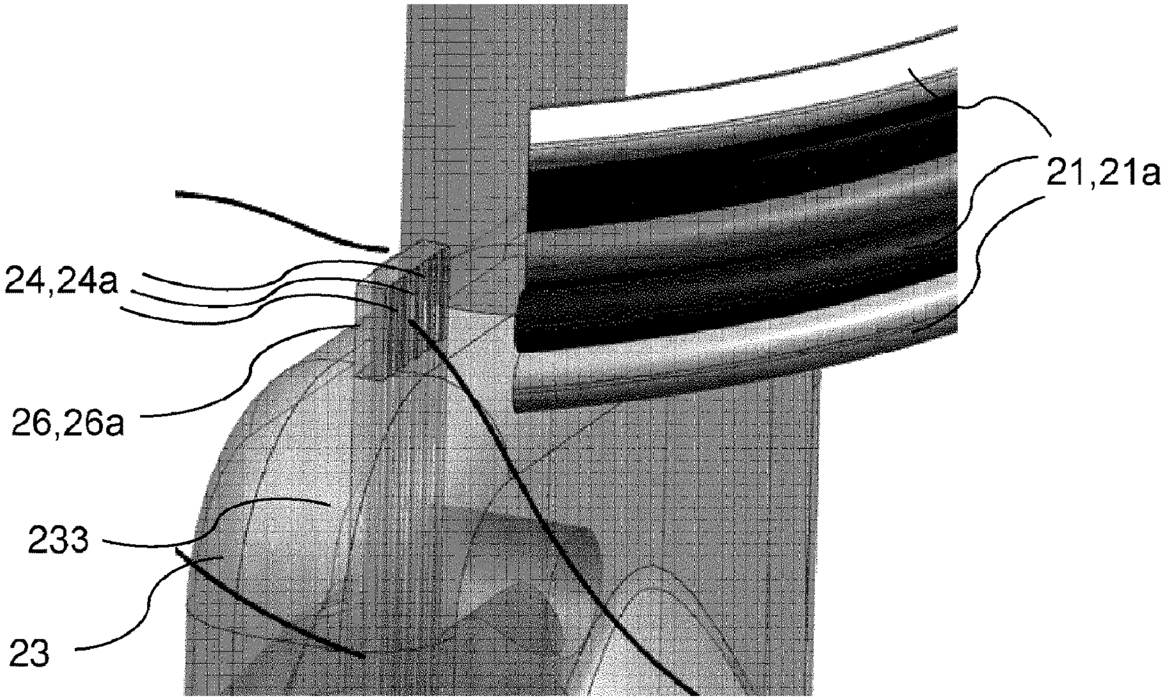

FIG. 4A-B schematically illustrates an enlarged view 30 of a glass stem 23 with a mounted/supported LED light engine 21*a*, i.e. a plurality of, i.e. five, LED filaments 21, and with a feedthrough carrier 26, in the FIG. 4A-B a glass bar 26*a*, disposed in the glass stem 23, with a plurality of, i.e. seven, conductive tracks 24*a* deposited as electrical conductors 24 thereon, in this case via screen printing but this could alternatively be obtained via for example, pasting, PVD, CVD, CSD, or via a lithographic method. FIG. 4B schematically illustrates a more detailed view of a part of the feedthrough carrier sealed in the stem as shown in the embodiment of FIG. 4A. The glass of the glass stem 23 is composed of a first glass, i.e. glass with reference number 220 having the properties as given in Table 1. The glass bar feedthrough body 26*a* is composed of a second glass, i.e. glass with reference number 342 having the properties as given in table 1. The matching properties of the first and second glass enable the glass bar feedthrough body 26*a* as well as the conductive tracks 24*a* of being suitably, gastightly sealed over sealing length SL, as shown in FIG. 4A, into the tubular portion 232 of the glass stem. On the glass stem a spiral-shaped LED light engine 21*a* is mounted comprising a plurality of independently controllable LED filaments 21, each of the filament 21 is connected (connection not shown, but which can conveniently be obtained by a male-female, plug-like construction) to a respective conductive track 24*a* on the feedthrough body 26*a*. The electrically conductive tracks 24*a* are made of copper metal. The stem 23 with supported light engine 21*a* as shown in FIG. 4A can suitably be applied as an alternative for the stem and supported light engine as shown in the lamp of FIG. 2.

Figure 5:
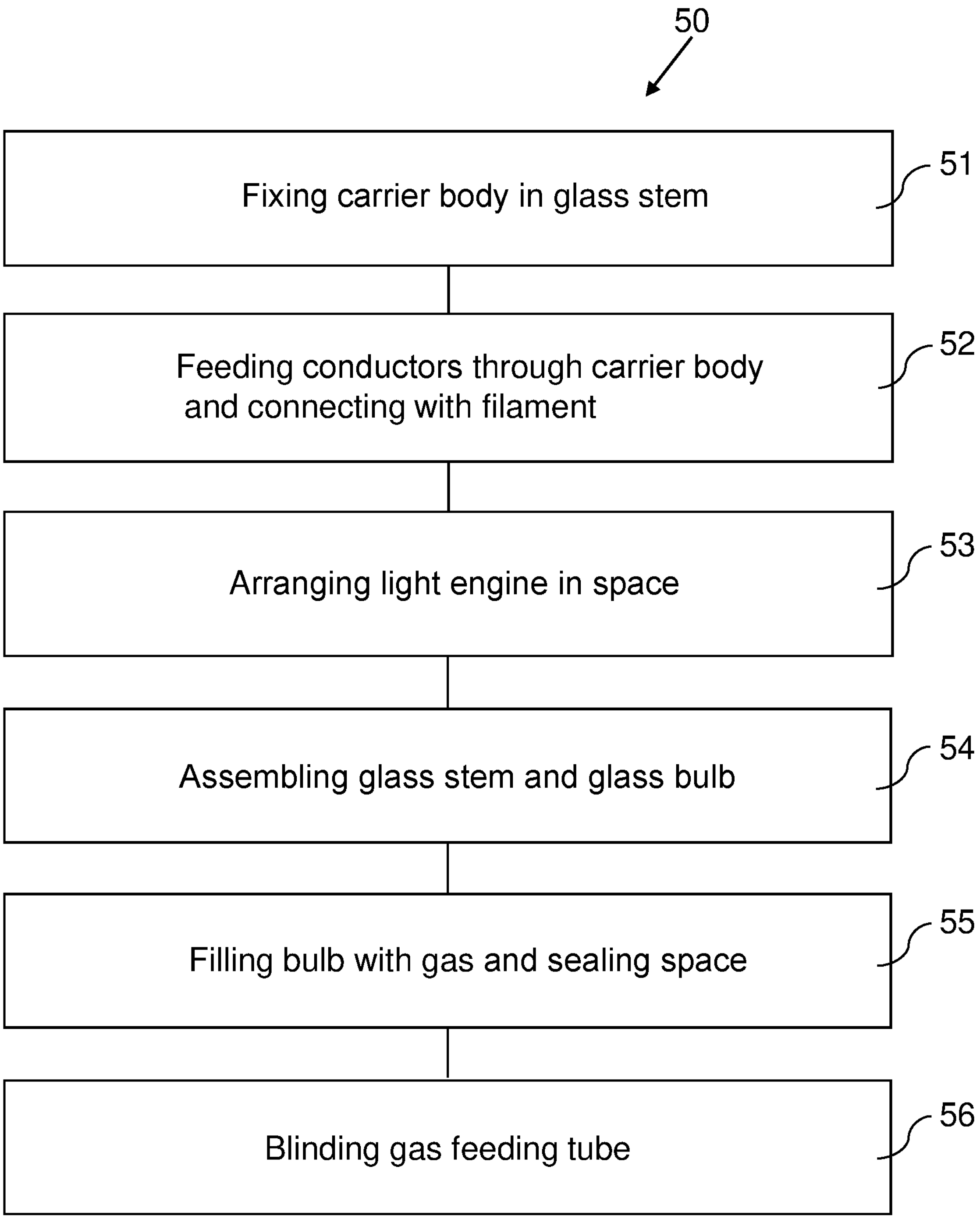
FIG. 5 schematically illustrates in a flow chart type diagram, an embodiment of a method for manufacturing the light bulb according to the present disclosure.

FIG. 5 schematically illustrates in a flow chart type diagram, an embodiment of a method 50 for manufacturing the light bulb according to the present disclosure.

In consideration of the high temperatures required to melt the feedthrough tube in the glass stem, as a first step 51 of the method 50 of the present disclosure, the feedthrough carrier is fixed, for example, melted in the glass stem.

Following that, at step 52, the plurality of conductive wires are fed in the feedthrough tube and then connected with light engine contacts, such as contacts of each of the plurality of filament. Alternatively, step 51 and 52 may be carried out in reverse order.

Following the steps 51 and 52, in step 53 the light engine is arranged in the space enclosed by the light transmissive surface and the glass stem.

Thereafter, at step 54, the glass stem, which now has the tube fixed/sealed therein and the conductive wires in place in the tube, is assembled with the light transmissive surface structure. This is done as in a conventional way, for example via fusion via melting the flare of the stem to the light transmissive surface structure.

After that, the bulb may optionally be filled with gas and sealed at step 55, and then the gas feeding tube may be blinded at step 56.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A light bulb comprising:

a light engine arranged within a space enclosed by a light transmissive surface structure and a glass stem;

the glass stem comprising a mutually connected flare and tubular portion, the stem supporting the light engine and is fused by its flare to the light transmissive surface structure;

a feedthrough body extending through the glass stem and being fixed by fusion in said tubular portion, wherein the feedthrough body is provided with a plurality of electrical conductors electrically isolated from each other which extend through the glass stem and connect said light engine to at least one power and signal source, wherein said feedthrough body is made of a ceramic, or a glass, and wherein the glass stem has a first melting point Tm1 and the feedthrough body has a second melting point Tm2, wherein Tm2-Tm1>=75° C.

2. The light bulb according to claim 1, wherein the space is gastightly sealed by the light transmissive surface structure and the glass stem;

wherein the feedthrough body is sea lingly fixed over a sealing length in a gastight manner in said tubular portion, and wherein said electrical conductors extend in a gastight manner through the glass stem.

3. The light bulb according to claim 1, wherein said glass stem has a first coefficient of thermal eimension and the feedthrough body has a second coefficient of thermal expansion, wherein the first and second coefficient of thermal expansion differ by no more than |1*10-6/K|.

4. The light bulb according to claim 3, wherein said plurality of conductive wires are individually insulated with an insulation layer having a coefficient of thermal expansion matching the coefficient of thermal expansion of said conductive wires.

5. The light bulb according to claim 4, wherein said insulation layer is made of one of mylar and silicone.

6. The light bulb according to claim 1, wherein feedthrough body is a feedthrough tube, the electrical conductors are conductive wires which extend in a gastight manner through said feedthrough tube.

7. The light bulb according to claim 6, wherein said feedthrough tube is made of metal, ceramic or glass.

8. The light bulb according to claim 6, wherein said plurality of conductive wires are gastightly sealed in said feedthrough tube using an elastic and adhesive seal compound.

9. The light bulb according to claim 8, wherein said seal compound comprises one of glue and epoxy, preferably said seal compound comprises at least one of the group comprising epoxy resin, amorphous silica, titanium dioxide, non-fibrous aluminum oxide, oxybis(ethyleneoxy)bis(propylamine), butyl 2,3-epoxypropyl ether, bisphenol-A epichlorhydrin resin.

10. The light bulb according to claim 1, wherein the feedthrough body is a feedthrough carrier made of an electrically insulating material and electrical conductors are conductive tracks provided on a surface of the feedthrough carrier.

11. The light bulb according to claim 10, wherein said feedthrough carrier is made of a ceramic, or a glass and wherein the electrical conductors are conductive tracks provided on an outer surface of the feedthrough carrier.

12. The light bulb according to claim 10, wherein the tracks are made of copper or cermet material comprising alumina and/or aluminum nitride as a refractory oxide and aluminum, molybdenum and/or tungsten as a metal.

13. The light bulb according to claim 1, wherein the plurality of electrical conductors extending through the glass stem and connect said light engine to at least one power and signal source numbers at least four.

14. A method of manufacturing the light bulb in accordance with claim 1, comprising the steps of:

I) fusing a feedthrough body in a tubular portion of a glass stem;

II) providing the feedthrough body with a plurality of mutually electrically isolated electrical conductors;

III) connecting said plurality of electrical conductors with light engine contacts supported by said glass stem;

IV) arranging said light engine in a space enclosed by a light transmissive surface; and V) closing said space by assembling said glass stem and said light transmissive surface structure by fusion melting said light transmissive surface with a flare portion of the glass stem.

15. The method according to claim 14, wherein the space is gastightly sealed by the light transmissive surface structure and the glass-stem, the feedthrough body is sealingly fixed over a sealing length in a gastight manner in said tubular portion, and said electrical conductors extend in a gastight manner through the glass stem, the method further comprising a step of filling a gas to said space via the tubular portion before gastightly sealing said tubular portion.

16. A light bulb comprising:

a light engine arranged within a space enclosed by a light transmissive surface structure and a glass stem;

the glass stem comprising a mutually connected flare and tubular portion, the stem supporting the light engine and is fused by its flare to the light transmissive surface structure;

a feedthrough body extending through the glass stem and being fixed by melting the feedthrough body in said tubular portion, wherein the feedthrough body is provided with a plurality of electrical conductors electrically isolated from each other which extend through the glass stem and connect said light engine to at least one power and signal source, wherein said feedthrough carrier body is made of a ceramic, or a glass, and wherein the glass stem has a first melting point Tm1 and the feedthrough carrier has a second melting point Tm2, wherein Tm2-Tm1>=75° C.

* * * * *